(12) United States Patent
Branagan et al.

(10) Patent No.: US 8,704,134 B2
(45) Date of Patent: Apr. 22, 2014

(54) HIGH HARDNESS/HIGH WEAR RESISTANT IRON BASED WELD OVERLAY MATERIALS

(75) Inventors: Daniel James Branagan, Idaho Falls, ID (US); M. Craig Marshall, Iona, ID (US); Brian Meacham, Idaho Falls, ID (US)

(73) Assignee: The NanoSteel Company, Inc., Providence, RI (US)

( * ) Notice: Subject to any disclaimer, the term of this patent is extended or adjusted under 35 U.S.C. 154(b) by 1151 days.

(21) Appl. No.: 11/458,209

(22) Filed: Jul. 18, 2006

(65) Prior Publication Data

US 2007/0029295 A1 Feb. 8, 2007

Related U.S. Application Data

(63) Continuation-in-part of application No. 11/057,400, filed on Feb. 11, 2005, now Pat. No. 7,553,382.

(51) Int. Cl.
*B23K 35/22* (2006.01)
*B23K 35/30* (2006.01)
*C22C 38/02* (2006.01)

(52) U.S. Cl.
CPC ......... *B23K 35/3026* (2013.01); *B23K 35/3053* (2013.01); *C22C 38/02* (2013.01)
USPC ..................................... 219/146.1; 219/145.1

(58) Field of Classification Search
USPC ......... 428/553, 570; 75/122, 134 F, 171, 176, 75/252, 254, 255; 219/145.1
See application file for complete search history.

(56) References Cited

U.S. PATENT DOCUMENTS

| | | | | |
|---|---|---|---|---|
| 4,101,319 A | * | 7/1978 | Beyer et al. | 75/252 |
| 4,231,793 A | * | 11/1980 | Kruske et al. | 420/453 |
| 4,297,135 A | | 10/1981 | Giessen et al. | |
| 4,365,994 A | * | 12/1982 | Ray | 148/325 |
| 4,495,691 A | * | 1/1985 | Masumoto et al. | 29/527.5 |
| 4,842,657 A | | 6/1989 | Masumoto et al. | |
| 5,003,155 A | * | 3/1991 | Chai et al. | 219/145.22 |

(Continued)

FOREIGN PATENT DOCUMENTS

| | | |
|---|---|---|
| DE | 3120168 | 2/1982 |
| EP | 0072893 | 3/1983 |

(Continued)

OTHER PUBLICATIONS

Ma, et al., "Effect of Nb addition on glass-forming ability, strength, and hardness of Fe—B—Zr amorphous alloys", Materials Research Bulletin vol. 34 No. 6 (1999) pp. 915-920.*

(Continued)

*Primary Examiner* — Tu B Hoang
*Assistant Examiner* — Thien S Tran
(74) *Attorney, Agent, or Firm* — Grossman, Tucker, Perreault & Pfleger, PLLC

(57) ABSTRACT

The present application relates to iron based glass forming alloys and their manufacture in powder, cored wire and stick electrode form to produce feedstock for a wide variety of weld overlay hardfacing application techniques. The alloys when welded form structures which are extremely hard and correspondingly extremely wear resistant. The novel approach of these alloys allow the replacement of conventional high hardness and wear resistant hardfacing alloys which are often composite materials made up of a binder and hard particles such as carbides, borides, borocarbides, nitrides, etc.

5 Claims, 18 Drawing Sheets

(56) References Cited

U.S. PATENT DOCUMENTS

| | | | | |
|---|---|---|---|---|
| 5,250,355 | A | * | 10/1993 | Newman et al. .............. 428/367 |
| 5,966,064 | A | | 10/1999 | Yoshizawa et al. |
| 6,007,922 | A | * | 12/1999 | Sue et al. ..................... 428/561 |
| 6,258,185 | B1 | | 7/2001 | Branagan et al. |
| 6,350,323 | B1 | | 2/2002 | Inoue et al. |
| 6,689,234 | B2 | | 2/2004 | Branagan |
| 2003/0051781 | A1 | * | 3/2003 | Branagan ..................... 148/561 |
| 2004/0250929 | A1 | | 12/2004 | Branagan et al. |
| 2006/0180252 | A1 | | 8/2006 | Branagan et al. |
| 2008/0053274 | A1 | | 3/2008 | Branagan et al. |

FOREIGN PATENT DOCUMENTS

| | | |
|---|---|---|
| EP | 1482064 | 12/2004 |
| JP | 55104450 | 8/1980 |
| JP | 58055557 | 4/1983 |
| JP | 59013056 | 1/1984 |
| JP | 61157661 | 7/1986 |
| JP | 01025943 | 1/1989 |
| WO | 0229832 | 4/2002 |
| WO | 03069000 | 8/2003 |

OTHER PUBLICATIONS

International Preliminary Report on Patentability dated Jan. 29, 2009 issued in related International Patent Application No. PCT/US2007/073757.
U.S. Office Action dated Jan. 27, 2009 issued in related U.S. Appl. No. 11/843,138.
International Search Report and Written Opinion dated Jan. 28, 2008 issued in International Patent Application No. PCT/US0773757.
International Search Report and Written Opinion dated Feb. 14, 2008 issued in International Patent Application No. PCT/US0604198.
Pekala et al., "Transport and Magnetic Properties of HITPERM alloys," IOP Publishing, Nanotechnology 14 (2003) pp. 196-199.
U.S. Office Action dated May 21, 2008 issued in related U.S. Appl. No. 11/843,138.
Branagan, et al., "Developing Extreme Hardness (>15 GPa) in iron based nanocomposites," Composites: Part A 33 (2002) pp. 855-859.
Kishitake, "Characterization of Plasma Sprayed Fe-10Cr-10Mo-(C,B) Amorphous Coatings," Journal of Thermal Spray Technology, vol. 5(2), Jun. 1996, pp. 145-153.
U.S. Office Action dated May 27, 2008 issued in related U.S. Appl. No. 11/057,400.
Inoue, et al., "New Fe-based bulk glassy alloys with high saturated magnetic flux density of 1.4-1.5T," Materials Science and Engineering A 375-377 (2004), pp. 302-306.
Marin, et al., "Influence of Cu and Nb on Relaxation and Crystallization of Amorphous FesiB(CuNb) Wires," Nanostructured Materials, vol. 10 No. 2 (1998) pp. 299-310.
Kulik, "Nanocrystallization of Matalic Glasses," Journal of Non-Crystaline Solids 287 (2001), pp. 145-161.
Ma, et al., "Effect of Nb addition glass-forming ability, strength and hardness of Fe—B—Zr amorphous alloys," Materials Research Bulletin vol. 34 No. 6 (1999) pp. 915-920.
U.S. Office Action dated Sep. 6, 2007 issued in related U.S. Appl. No. 11/057,400.
Office Action dated Sep. 21, 2009 issued in related U.S. Appl. No. 11/843,138.
European Search Report dated Jan. 18, 2010 issued in related European Patent Application No. 06734457.
Chinese Office Action dated Mar. 12, 2010 issued in related Chinese Patent Application No. 20068008186.9.
Chinese Office Action dated Jan. 20, 211 issued in related Chinese Patent Application No. 200680008186.9.
U.S. Office Action dated Jun. 16, 2010 issued in related U.S. Appl. No. 11/843,138.
Chinese Office Action dated Aug. 24, 211 issued in related Chinese Patent Application No. 200680008186.9.
Canadian Office Action dated Aug. 25, 2011 issued in related Canadian Patent Application No. 2597562.
Chinese Office Action dated Mar. 25, 2011 issued in related Chinese Patent Application No. 200780034167.8.

* cited by examiner

HIGH HARDNESS/HIGH WEAR RESISTANT IRON BASED WELD OVERLAY MATERIALS

CROSS-REFERENCE TO RELATED APPLICATIONS

The present application is a continuation-in-part of U.S. patent application Ser. No. 11/057,400 filed Feb. 11, 2005, incorporated herein by reference.

FIELD OF INVENTION

The present disclosure relates to iron based glass forming alloys and a method of producing the alloys to produce feedstock for a variety of weld overlay hardfacing application techniques. The present application also relates to targeted alloy chemistries that may be processed into industrial products using conventional industrial processing strategies without the necessity to macroscopically blend to form a macro-composite.

BACKGROUND

Weld overlay materials may be macrocomposites which may be developed by starting with hard particles which may include carbides (i.e. WC, VC, $Cr_3C_2$, $Cr_{23}C_6$, TiC, HfC, etc.), borides ($TiB_2$, $ZrB_2$, etc.), borocarbides ($M(BC)_2$, $M(BC)_3$, $M_{23}(BC)_6$, etc.), nitrides (i.e. BN, TiN, AlN, etc.), and/or other specific hard phases like diamond, etc. which may be incorporated at various volume fractions (i.e typically 15 to 90 at % hard particle) to an appropriate binder which may be nickel (or nickel alloy) based, cobalt (or cobalt alloy) based, or iron (or iron alloy) based. The binder may provide a matrix to hold the hard particles by wetting its surface sufficiently so that it is captured while not completely dissolving. The binder may also provide a measure of toughness/crack resistance to enable the composite to perform adequately in service.

SUMMARY

An exemplary embodiment relates to a metallic alloy composition that may be used for hardfacing weld overlay applications. The alloy composition may include 35 to 65 at % of a base metal made up of iron and manganese; 10 to 50 at % of interstitial elements selected from boron, carbon, silicon or combinations thereof; 3 to 30 at % of a transition metal selected from chromium, molybdenum, tungsten or combinations thereof; and 1 to 15 at % niobium. The composition may form a ductile matrix of α-Fe and/or γ-Fe including phases of complex boride, complex carbides or borocarbides.

A further exemplary embodiment also relates to a metallic alloy composition which may be used for hardfacing weld overlay applications. The alloy composition may include 44.2 to 55.4 at % of a base metal made up of iron and manganese, 20.2 to 39.3 at % of a interstitial element selected from the group boron, carbon, silicon and combinations thereof, 13.3 to 20.5 at % of a transition metal selected from the group chromium, molybdenum, tungsten and combinations thereof, and 3.2 to 4.4 at % of niobium.

An additional exemplary embodiment relates to a method of hardfacing a substrate. The method may include providing a composition comprising 35 to 65 at % of a base metal made up of iron and manganese, 10 to 50 at % of an interstitial element selected from the group boron, carbon, silicon and combinations thereof, 3 to 30 at % of a transition metal selected from the group chromium, molybdenum, tungsten and combinations thereof, and 1 to 15 at % of niobium, and welding the composition onto a substrate.

BRIEF DESCRIPTION OF DRAWINGS

The detailed description below may be better understood with reference to the accompanying figures which are provided for illustrative purposes and are not to be considered as limiting any aspect of the invention.

DETAILED DESCRIPTION

The present invention relates to alloy designs that may form liquid melts of a homogeneous nature. The targeted alloy chemistries may be processed into industrial products using conventional industrial processing strategies without the necessity to macroscopically blend to form a macrocomposite. For example to produce powders, methods such as atomization may be used break up liquid melts into powder particles. The powder particles may then be sized to yield targeted powder sizes for various overlay application strategies. Furthermore the particles may be used alone, in conjunction with or in combination with commercially available powders to form cored wires and stick electrodes for various welding processes.

The alloy designs for hardfacing may be formulated around glass forming chemical formulations. The metallic alloy composition may be composed of a base metal, at least one interstitial element, at least one transition metal and niobium. The base metal may include iron and manganese and may be present in the alloy in the range of 35 to 65 atomic weight percent (at %) of the composition, including all values and increments therein. Interstitial element may include, for example, boron, carbon and/or silicon, which may be present in the alloy in the range of 10 to 50 at % of the composition, including all values and increments therein. The transition metal may include, for example, chromium, molybdenum and/or tungsten, which may be present in the range of about 3 to 30 at % of the composition, including all values and increments therein. Furthermore, the niobium may be present in the range of 1 to 15 at % of the composition. In an exemplary embodiment the base metal may be present in the range of 44.2 to 55.4 at %, one or more interstitial elements may be present in the range of 20.2 to 39.3 at %, one or more transition metals may be present in the range of 13.3 to 20.5 at % and niobium may be present in the range of 3.2 to 4.4 at %.

Exemplary Alloy Compositions

Figure 2:
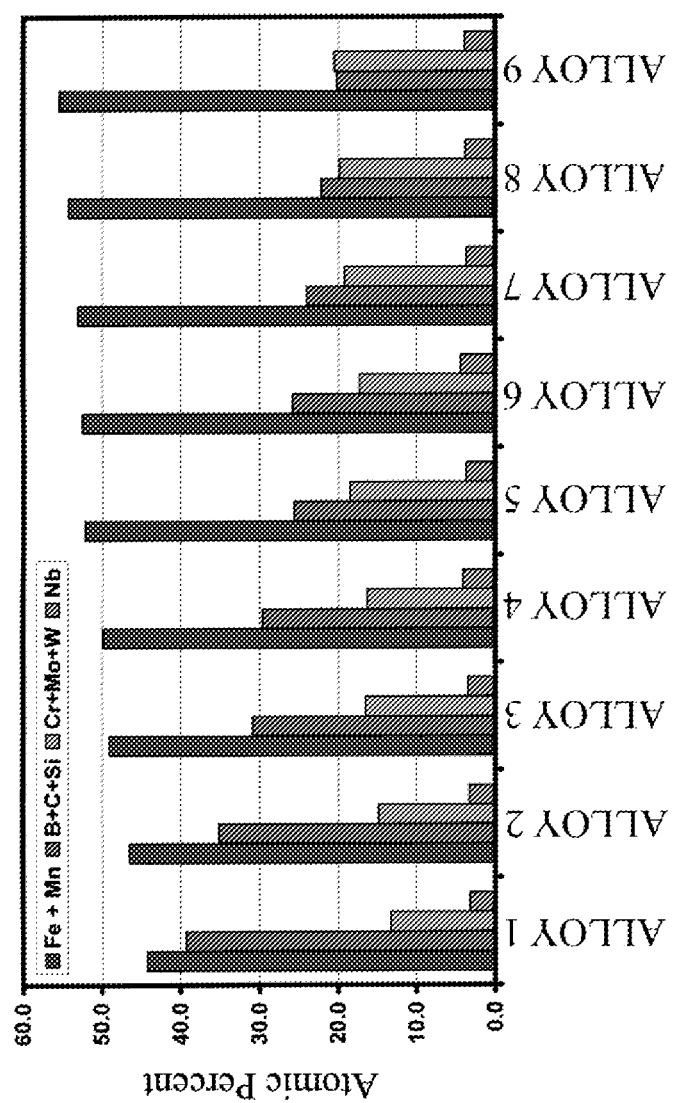
FIG. 2 is a graph depicting the atomic percent of exemplary weld alloy chemistries as a function of Fe+Mn (left block), B+C+Si (left middle), Cr+Mo+W (right middle), and Nb (right block).

Exemplary alloy chemistries are summarized in Table 1. The alloys may be produced either on a pilot or production scale and then further processed as feedstock for hardfacing for various weld overlay application strategies. In FIG. 2, the atomic percent of each alloy is further graphed as a function of Fe+Mn, B+C+Si, Cr+Mo+W, and Niobium. Thus, these exemplary chemistries, while not all encompassing, represent chemistries that may achieve specific refined structures having a desired specific hardness and wear resistance properties.

TABLE 1

Atomic Percent Of GMAW Weld Alloys

| Alloy | Fe + Mn (at %) | B + C + Si (at %) | Cr + Mo + W (at %) | Nb (at %) |
|---|---|---|---|---|
| ALLOY 1 | 44.2 | 39.3 | 13.3 | 3.2 |
| ALLOY 2 | 46.6 | 35.2 | 14.9 | 3.3 |
| ALLOY 3 | 49.1 | 30.9 | 16.5 | 3.5 |
| ALLOY 4 | 49.9 | 29.7 | 16.3 | 4.1 |
| ALLOY 5 | 52.2 | 25.6 | 18.5 | 3.7 |
| ALLOY 6 | 52.5 | 25.8 | 17.3 | 4.4 |
| ALLOY 7 | 53.1 | 24.0 | 19.2 | 3.7 |
| ALLOY 8 | 54.2 | 22.2 | 19.8 | 3.8 |
| ALLOY 9 | 55.4 | 20.2 | 20.5 | 3.9 |

As alluded to above, the alloy composition may be atomized to provide a powder. Exemplary atomization processes may include gas atomization, centrifugal atomization or water atomization. The powder particles may be sized using various techniques such as screening, classification and air classification. In an exemplary embodiment, at least 50% of the powder particles may fall within the ranges of 10 to 300 µm, including all values and increments therein such as in the range of 53 to 106 µm, 53 to 150 µm or 45 to 180 µm, etc. It should be appreciated however, that other particles size ranges may be contemplated and that the ranges may be tighter or broader as well as the particles sizes larger or smaller depending upon the application or desired hardfacing overlay weld technique. For example, during laser fusing particles 53 to 106 µm may be used as feedstock and for plasma transferred arc-welding (PTAW), 45 to 180 µm powders may be used for feedstock.

The powders contemplated herein may be used alone, in combination with or in conjunction with commercially available powders, or commercially available powders may be used alone to hit specific target chemistries and put into the inside of a cored wire to make metal powder cored wires. The cored wires may be manufactured in various diameters in the range of 0.01 to 0.5 inches, including but not limited to all values and increments therein such as 0.045", 1/16", 7/64", 1/8", and 3/16". The cored wires may be used as feedstock for various welding processes which use wire. Examples of wire feed hardfacing techniques include, but are not limited to, gas metal arc-welding (GMAW), metal inert gas (MIG) welding, submerged arc welding, and open arc welding. The powder may also be used alone, with commercially available powders, or in conjuction with commercially available powders and put inside of a cored wire to make stick electrodes of various diameters including but not limited to 0.045", 1/16", 5/64", 3/32", 1/8", and 3/16" and welded through various hardfacing strategies including but not limited to shielded metal arc welding (SMAW) or stick welding.

The alloys may be applied to any number of substrates, including various steel alloys. As alluded to above, the alloys may be used in various overlay processes such as laser welding, plasma transferred arc-welding (PTAW), gas metal arc-welding (GMAW), metal inert gas welding (MIG), submerged arc welding, open arc welding, shielded metal arc welding (SMAW) or stick welding.

Figure 1:
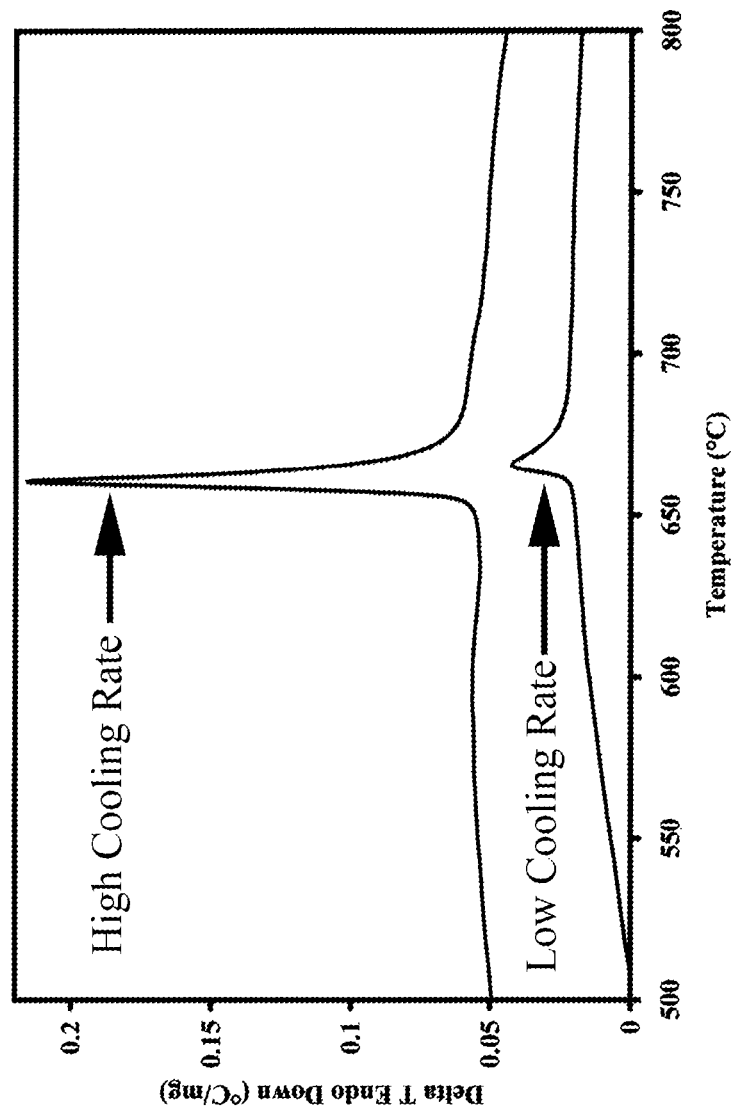
FIG. 1 illustrates exemplary DTA scans of ALLOY 6 which was solidified at two different cooling rates; the top curve illustrates high cooling rates and the bottom curve illustrates low cooling rates. Note that the glass to crystalline transformation peaks can clearly be seen.

In addition, as alluded to above, the alloys may be formulated to form substantially glassy compositions. For example in FIG. 1, exemplary DTA scans are shown for ALLOY 6 which was processed at high and low cooling rates. The upper curve illustrates an exemplary DTA scan of ALLOY 6 produced at high cooling rates and the lower curve illustrates an exemplary DTA scan of ALLOY 6 produced at lower cooling rates. The single exemplary glass to crystalline transformation peak on each curve is seen near a peak temperature of 660° C. Once again, note that the alloy may be produced in both powder and wire form for various hardfacing applications including laser, PTAW, GMAW, and MIG.

The formation of glass alloys may refine the scale of the crystalline microstructure. The level of refinement may depend on a variety of factors including the glass forming ability of the alloy, the cooling rate of the industrial processing method, the total heat input, the thickness of the weld overlay deposit, etc. The average cooling rate of the industrial welding process may be greater (i.e. faster) than the critical cooling rate for metallic glass formation of the feedstock material, and metallic glass weld deposits may be formed during welding. If the total heat input is insufficient to cause devitrification, metallic glass overlays may be formed with an angstrom scale microstructure but if the total heat input is too great, then partial or complete devitrification may occur resulting in the formation of a nanoscale composite microstructure.

If the critical cooling rate for metallic glass formation is greater than the average cooling rate of the chosen industrial weld overlay process, high undercoolings may still be obtained prior to nucleation and growth. Undercooling may be understood to be the lowering of the temperature of a liquid beyond the freezing temperature and still maintaining a liquid form. The undercooling, which may be many hundreds of degrees greater than that obtained in conventional alloys, may result in higher driving forces for nucleation, while a reduction in the temperature dependant diffusional processes, may result in an increased nucleation frequency and reduced time for grain/phase growth. Thus, as the level of undercooling is increased, the resulting average grain/phase size may be reduced.

The reduction of grain/phase and finer hard particle sizes may result in an increase in weld overlay toughness since less stress concentration may occur in individual particles and any cracks produced may be arrested/bridged in the more ductile matrix phases. Fine particles may also preferentially wear the matrix of conventional macrocomposite weld overlay materials. For example, conventional PTA powders may be made up using 45 to 180 µm coarse WC particulates and may be added to a nickel based matrix powder which may be an alloy containing nickel, chromium, boron, and silicon. While the resulting 45 to 180 µm (if no dissolution occurs) WC particles may be very hard, commonly the nickel matrix based on its chemistry may be Rc 35 to 50. Thus, if fine particles like sand are present, the matrix may preferentially wear resulting in pull-out of the WC hard phases.

Depending on the undercooling achieved, critical cooling rates, total heat input, etc. finer hard particle sizes may be formed in situ during welding. In the extreme case of a devitrifying glass, the hard carbide, boride, borocarbide, and/ or nitride particulates may be 5 to 100 nm in size, in other cases where high undercooling may achieved, the scale of the hard phases may be 400 to 1000 nm (i.e. 1 µm), and in other cases where limited undercooling may be achieved, the scale of the hard phases may be 1,000 nm to 25,000 nm (i.e. 25 µm). Thus, in almost all cases the scale of the hard particulates may be finer than those achieved in conventional commercially available hardfacing materials. The finer distribution of hard particle sizes may prevent preferential wear of the matrix under abrasive conditions.

Besides reductions in microstructural scale, the volume fraction of precipitates may be increased to high levels which may generally not be obtainable by conventional approaches. For example as may be shown by the case examples, various high volume fractions of hard boride, carbide, and/or borocarbide precipitates may be precipitated out during welding in the range of greater than 15% and at least up to 75% hard phase. In conventional PTA hardfacing macrocomposite powders, while any ratio of hard metal to binder may easily be mixed, generally only up to 65% hard metal may be used due to problems with incomplete wetting and brittleness. In cored wire, due to volume restrictions, less hard phases may be incorporated into the middle of the metal wire core. For example, commonly 35%, 40%, and 45% are the maximum fill ratios in making up metal cored wire in the range of 0.01 inches to 0.5 inches, including all values and increments therein such as 0.045", 1/16", and 7/64" respectively.

The alloys herein may be utilized at higher welding rates (i.e. inches per minute (IPM) wire feed welding or pounds per hour (lb/hr) in powder feed systems). In conventional macrocomposite weld overlay materials, higher deposition rates may necessitate higher heat input which may cause problems since the hard particulates which are added in the composite mix can often break down, dissolve completely or partially, and/or cause secondary precipitation of inferior phases which are either more brittle, or softer. In the presently contemplated alloy formulations, the hard particles may form during solidification and therefore these issues may not cause problems.

Once applied to a substrate, the alloys may exhibit hardness values greater than about 64 Rc and all values and ranges greater than 64 Rc. The maximum hardness of the alloy may occur within 250 microns of the base metal surface. Furthermore, utilizing an exemplary composition of 44.2 to 55.4 at % of a base metal, 20.2 to 39.3 at % of at least one interstitial element, 13.3 to 20.5 at % of at least one transition metal and 3.2 to 4.4 at % of niobium a hardness of greater than about Rc 68 may be obtained. In addition, as applied on a substrate the alloys may exhibit wear resistance as measured by ASTM G65 Procedure A (6,000 cycles) having a mass loss of less than 0.20 g, including all values and increments therein such as 0.1, 0.08 etc. Once again, utilizing an exemplary composition of 44.2 to 55.4 at % of a base metal, 20.2 to 39.3 at % of at least one interstitial element, 13.3 to 20.5 at % of at least one transition metal and 3.2 to 4.4 at % of niobium a wear resistance of less than 0.08 g may be obtained. Furthermore, as alluded to above, the alloys may include a ductile matrix consisting of α-Fe and/or γ-Fe phases including phases of complex borides (i.e. $M_2B$ and $M_3B$, wherein M may be a transition metal present in the alloy composition), complex carbides ($M_1C_1$ and $M_{23}C_6$, wherein M may be a transition metal present in the alloy composition) and/or borocarbides. Exemplary embodiments of the alloy hardness and wear properties are further described below.

Weld Overlay Hardness

The hardness of the weld overlays of the alloys shown in Table 1 was measured with Rockwell C. In Tables 2, 3, 4, and 5, the hardness is shown of the single and double pass weld overlays which were welded using GMAW. Note that ALLOY 5 hardness is shown in hardfacing deposits made from three different diameter wires; 1/16", 0.045", and 7/64". Also, note that the 7/64" weld overlay data are for samples welded in the open-arc condition (i.e. no cover gas). In Tables 6 and 7, the hardnesses of the single pass and double pass PTAW weld overlays are shown. As can be seen, all of the alloys shown with the exceptions of ALLOY 9 which was too soft and ALLOY 1 which was too brittle to get accurate readings, exhibited high hardness greater than Rc 64. Furthermore, a large fraction of these alloys achieved a hardness greater than Rc 68 while a few alloys including ALLOY 6, ALLOY 2, ALLOY 3, and ALLOY exceeded Rc 70.

Also, note that the high hardness's achieved as outlined in these Tables was achieved not only in the double pass samples but in the single pass samples as well, regardless of the effect of dilution. In conventional weld overlay materials, often high hardness and wear resistance may not be obtained until at least the second or third overlay layer, which may be due to the effects of dilution from the base substrate material which is welded. Note that for all of the samples in Tables 2 through 7, welding was performed on 'blank' A36 steel so that little or no additions are picked up by welding. The high single pass hardness in the alloys may not be because dilution may not occur but instead because the alloys are "overalloyed," that is the alloys take into account that dilution may occur and the alloys may be adjusted accordingly, allowing for maximum hardness to be obtained.

TABLE 2

Single Pass Hardness of GMAW Weld Overlays

| Hardness (Rc) | ALLOY 2 | ALLOY 3 | ALLOY 5 (1/16") | ALLOY 5 (0.045") | ALLOY 5 (7/64") |
|---|---|---|---|---|---|
| point #1 | 67.6 | 73.0 | 72.1 | 70.0 | 72.2 |
| point #2 | 69.7 | 72.0 | 70.8 | 69.0 | 72.6 |
| point #3 | 67.5 | 72.8 | 70.3 | 70.0 | 72.1 |
| point #4 | 70.7 | 72.9 | 70.7 | 70.0 | 72.2 |
| point #5 | 71.1 | 72.6 | 71.5 | 70.0 | 71.3 |
| point #6 | 71.3 | 72.0 | 72.0 | 70.0 | 71.9 |
| point #7 | 68.5 | 72.6 | 72.5 | 70.0 | 72.8 |
| point #8 | 70.0 | 72.8 | 70.7 | 70.0 | 71.9 |
| point #9 | 71.6 | 72.0 | 71.3 | 69.0 | 72 |
| point #10 | 71.8 | 72.8 | 72.3 | 69.0 | 71.5 |
| Average | 70.0 | 72.6 | 71.4 | 69.7 | 72.05 |

TABLE 3

Double Pass Hardness of GMAW Weld Overlays

| Hardness (Rc) | ALLOY 2 | ALLOY 3 | ALLOY 5 (1/16") | ALLOY 5 (0.045") | ALLOY 5 (7/64") |
|---|---|---|---|---|---|
| point #1 | 66.4 | 73.5 | 72.0 | 70.5 | 72.4 |
| point #2 | 70.2 | 74.3 | 70.7 | 72.1 | 71.9 |
| point #3 | 65.3 | 73.2 | 71.0 | 71.5 | 70.4 |
| point #4 | 66.9 | 73.7 | 71.9 | 71.8 | 71.5 |
| point #5 | 67.1 | 72.7 | 71.4 | 71.7 | 71.7 |
| point #6 |  | 74.8 | 70.9 | 69.7 | 72.1 |
| point #7 |  | 73.0 | 70.9 | 72.5 |  |
| point #8 |  | 70.5 | 71.6 | 71.7 |  |
| point #9 |  | 71.4 | 71.9 | 71.2 |  |
| point #10 |  | 73.5 | 71.8 | 70.8 |  |
| Average | 67.2 | 73.1 | 71.4 | 71.4 | 71.7 |

TABLE 4

Single Pass Hardness of GMAW Weld Overlays

| Hardness (Rc) | ALLOY 6 | ALLOY 7 | ALLOY 8 | ALLOY 9 | ALLOY 1 |
|---|---|---|---|---|---|
| point #1 | 69.6 | 66.0 | 63.0 | 59.0 | brittle |
| point #2 | 69.8 | 66.0 | 65.0 | 60.0 |  |
| point #3 | 69.2 | 68.0 | 64.0 | 58.0 |  |
| point #4 | 69.2 | 68.0 | 66.0 | 56.0 |  |
| point #5 | 69.2 | 68.0 | 66.0 | 57.0 |  |
| point #6 | 68.5 | 69.0 | 64.0 |  |  |
| point #7 | 69.6 |  |  |  |  |
| point #8 | 69.2 |  |  |  |  |
| point #9 | 69.6 |  |  |  |  |
| point #10 | 70.6 |  |  |  |  |
| Average | 69.5 | 67.5 | 64.7 | 58.0 | Brittle |

TABLE 5

Double Pass Hardness of GMAW Weld Overlays

| Hardness (Rc) | ALLOY 6 | ALLOY 7 | ALLOY 8 | ALLOY 9 | ALLOY 1 |
|---|---|---|---|---|---|
| Point #1 | 71.0 | 67.0 | 63.0 | 63.3 | Brittle |
| Point #2 | 71.1 | 68.0 | 67.0 | 61.8 |  |
| point #3 | 71.6 | 66.0 | 66.0 | 64.4 |  |
| point #4 | 70.6 | 68.0 | 66.0 | 60.9 |  |
| point #5 | 70.7 | 66.0 | 65.0 | 62.4 |  |
| point #6 | 70.8 | 69.0 | 66.0 | 62.7 |  |
| point #7 | 72.0 |  |  | 62.6 |  |
| point #8 | 71.7 |  |  | 61.1 |  |
| point #9 | 71.8 |  |  | 62.1 |  |
| Point #10 | 71.8 |  |  | 63.8 |  |
| Average | 71.3 | 67.3 | 65.5 | 62.5 | Brittle |

TABLE 6

Single Pass Hardness of PTAW Weld Overlays

| Hardness (Rc) | ALLOY 5 | ALLOY 6 | ALLOY 4 |
|---|---|---|---|
| Point #1 | 64.9 | 60 | 72.8 |
| Point #2 | 65.8 | 63.3 | 73.3 |
| Point #3 | 66.3 | 61 | 72.8 |
| Point #4 | 64 | 66 | 73 |
| Point #5 | 63.9 | 62.3 | 73 |
| Point #6 | 64.2 | 65.9 | 73.2 |
| Point #7 | 65.6 | 67.8 | 72.9 |
| Point #8 | 62.8 | 64.7 | 73.2 |
| Point #9 | 62.6 | 68.2 | 73.3 |
| point #10 | 62.5 | 66.2 | 72.9 |
| Average | 64.3 | 64.5 | 73.0 |

TABLE 7

Double Pass Hardness of PTAW Weld Overlays

| Hardness (Rc) | ALLOY 5 | ALLOY 6 | ALLOY 4 |
|---|---|---|---|
| Point #1 | 60.0 | 63.5 | 70.3 |
| Point #2 | 63.3 | 63.7 | 71.5 |
| Point #3 | 61.0 | 64.1 | 73.5 |
| Point #4 | 66.0 | 62.2 | 73.4 |
| Point #5 | 62.3 | 64.1 | 73.8 |
| Point #6 | 65.9 | 66.2 | 73.5 |
| Point #7 | 67.8 | 66.2 | 73.8 |
| Point #8 | 64.7 | 67.7 | 73.5 |
| Point #9 | 68.2 | 66.8 | 73.6 |
| point #10 | 66.2 | 66.6 | 74.0 |
| Average | 64.5 | 65.1 | 73.1 |

Weld Overlay Wear Resistance

The wear resistance of the weld overlays was measured using a Falex Friction & Wear Test Machine following the dry rubber wheel sand abrasion ASTM G65 standard under the Procedure A conditions. Note that Procedure A involves testing for a duration of 6000 cycles. After performing the ASTM G65 Procedure A test, another subsequent Procedure A test was taken directly in the wear scar of the first. In Tables 8 and 9, selected ASTM G65 mass loss results are shown for the single and double pass GMAW and single pass PTAW weld overlay samples respectively. Note that the mass losses measured were indicative of very high wear rates with all of the samples showing mass losses which were below 0.20 g. In specific cases, including the ALLOY 3, Alloy 4, ALLOY 5, ALLOY 6 alloys, the mass losses measured were below 0.18 grams which corresponds to extremely low wear rates.

TABLE 8

ASTM G65 Procedure A Mass Loss on GMAW Overlays

| ASTM G65 | ALLOY 3 | ALLOY 5 | ALLOY 6 | ALLOY 9 |
|---|---|---|---|---|
| Single Pass Welds - mass loss (g) | | | | |
| 1st 6,000 cycles | 0.054 | 0.062 | 0.090 | 0.0887 |
| 2nd 6,000 cycles | 0.047 | 0.047 | 0.083 | 0.0895 |
| Double Pass Welds - mass loss (g) | | | | |
| 1st 6,000 cycles | 0.056 | 0.046 | 0.072 | 0.102 |
| 2nd 6,000 cycles | 0.039 | 0.069 | 0.071 | 0.067 |

TABLE 9

ASTM G65 Procedure A Mass Loss on PTAW Overlays

| ASTM G65 | ALLOY 5 | ALLOY 6 | ALLOY 4 |
|---|---|---|---|
| Single Pass Welds - mass loss (g) | | | |
| 1st 6,000 cycles | 0.067 | 0.079 | 0.084 |
| 2nd 6,000 cycles | 0.054 | 0.066 | 0.078 |
| Double Pass Welds - mass loss (g) | | | |
| 1st 6,000 cycles | 0.086 | 0.082 | 0.071 |
| 2nd 6,000 cycles | 0.052 | 0.074 | 0.058 |

EXAMPLES

The following examples are provided for informational purposes and are not meant to be construed so as to limit the scope of the present invention or the claims appended below.

Example #1

PTA Weld Overlay

Figure 3:
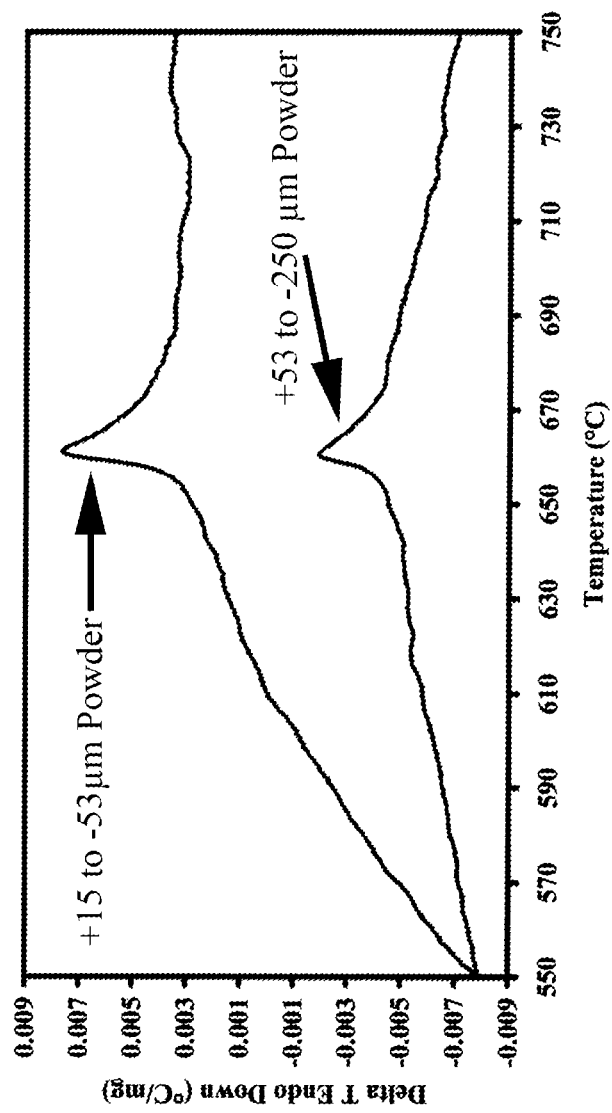
FIG. 3 illustrates exemplary DTA scans of ALLOY 5 gas atomized powder which was solidified at two different cooling rates; top curve 15 to 53 μm powder, bottom curve 53 to 250 μm powder. Note that the glass to crystalline transformation peaks may clearly be seen.

ALLOY 5 was inert gas atomized using argon to produce a powder with a distribution from 1 to 250 μm with an average mean size (d50) of 92.5 μm. In FIG. 3, DTA scans are shown of two different powder sizes, 15 to 53 μm and 53 to 250 μm. In both cases, glass to crystalline peaks were found showing that the starting powders were at least partially amorphous (i.e. contained metallic glass). The powder was sieved in several different sizes but downselected to yield a feedstock powder from 53 to 150 μm appropriate for PTAW welding. The feedstock powder was plasma transfer arc-welded to form single pass hardface deposits onto A36 steel using a Eutectic GAP 375 PTA weld system. The powder was welded at two different deposit rates of 3.5 and 18.0 lbs/hr. The Rockwell C hardness and ASTM G65 dry sand rubber wheel wear resistance (Procedure A) of the deposits were measured and are shown in Table 10. As shown, very high hardness (≈Rc 70) and very low wear rates (≈0.05-0.07 g mass loss) were obtained.

TABLE 10

Hardness/Wear Resistance of ALLOY 5 PTAW Weld Overlay

| Alloy | Lbs/Hr | Hardness Rc average | ASTM G65 1st 6000 cycles mass loss (g) | ASTM G65 2nd 6000 cycles mass loss (g) |
|---|---|---|---|---|
| ALLOY 5 | 3.5 | 69.9 | 0.0673 | 0.0543 |
| ALLOY 5 | 18.0 | 70.7 | 0.0550 | 0.0502 |

Figure 4A:
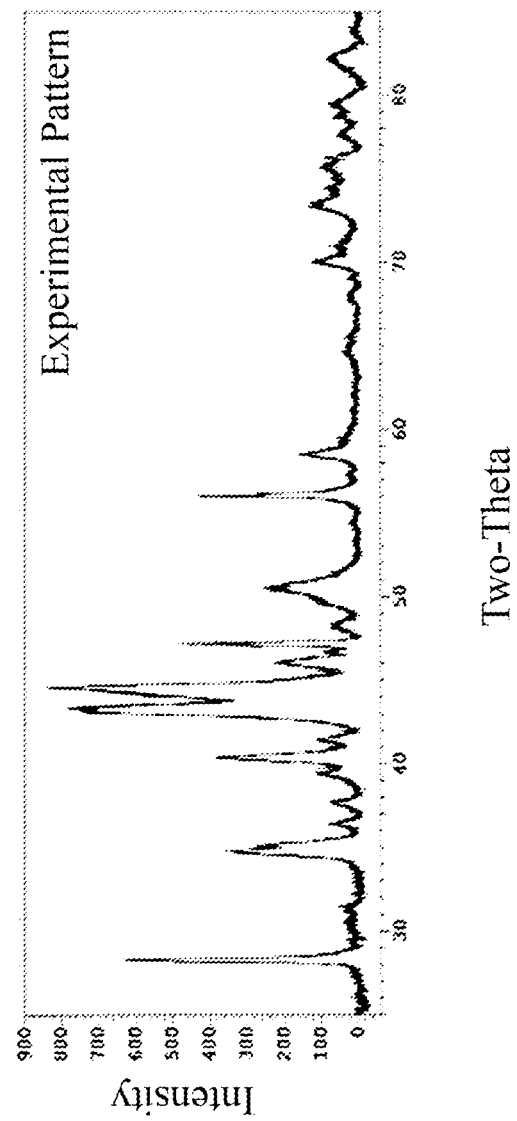
FIGS. 4a and 4b illustrate exemplary experimental (a) and Rietveld refined (b) X-Ray diffraction patterns for an ALLOY 5 PTAW weld overlay deposited at 3.5 lbs hour.
Figure 4B:
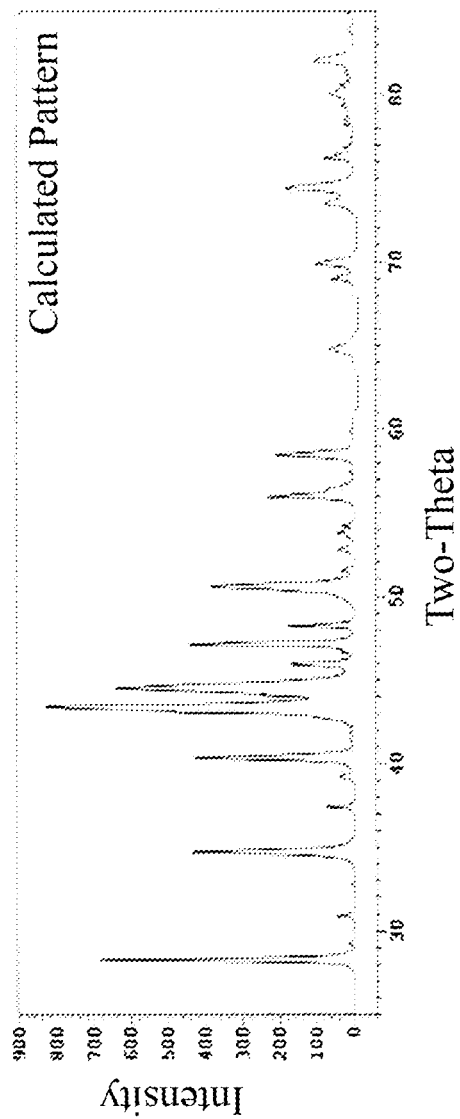
Figure 5A:
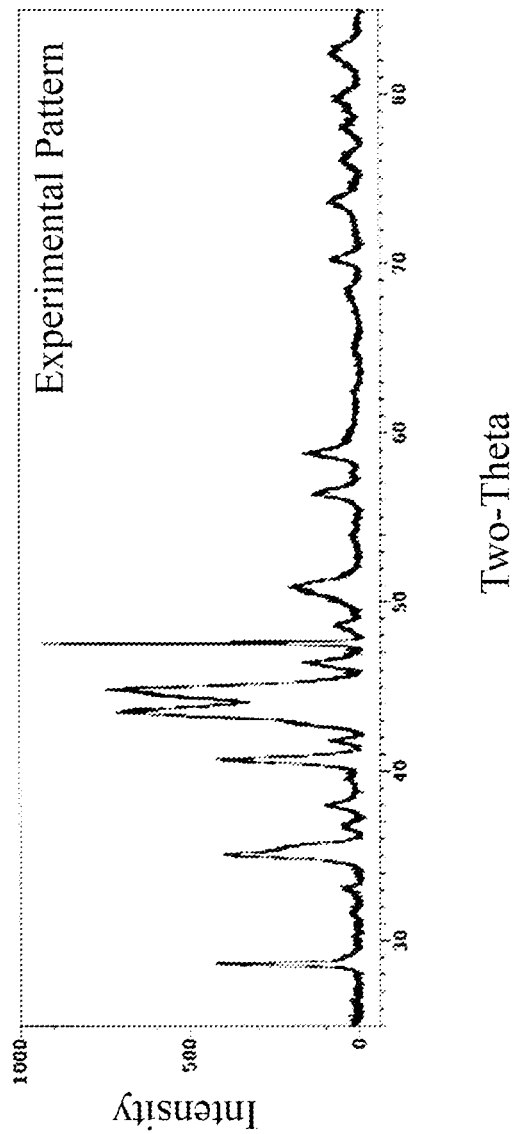
FIGS. 5a and 5b illustrate exemplary experimental (a) and Rietveld refined (b) X-Ray diffraction patterns of an ALLOY 5 PTAW weld overlay deposited at 18.0 lbs hour.
Figure 5B:
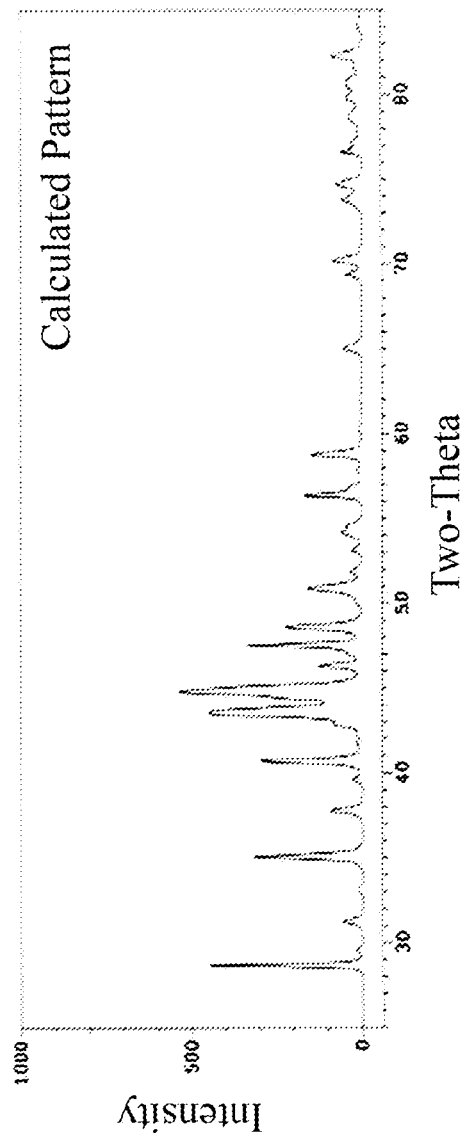

The microstructure of the weld overlay deposits were analyzed using X-ray diffraction to primarily identify the phases present and by using backscattered electrons in the SEM to primarily show the size and distribution of the phases present. The X-ray diffraction diagrams were further analyzed using Rietveld analysis to identify the phases present. In FIGS. 4a and 4b exemplary experimental (a) and Rietveld refined (b) X-Ray diffraction patterns for an ALLOY 5 PTAW weld overlay deposited at 3.5 lbs hour are shown. In FIGS. 5a and 5b exemplary experimental (a) and Rietveld refined (b) X-Ray diffraction patterns of an ALLOY 5 PTAW weld overlay deposited at 18.0 lbs hour are shown. In Table 11, the phases and the lattice parameters identified are shown for both the 3.5 and 18.0 lb/hr samples. Note that for both samples, the same phases were found but with different lattice parameters. The results show that a range of complex borides (i.e. $M_2B$ and $M_3B$) and complex carbides (i.e. $M_1C_1$ and $M_{23}C_6$) existed in a ductile matrix consisting of both α-Fe and γ-Fe phases.

TABLE 11

Phases Identified/Space Group/Lattice Parameters For ALLOY 5 PTAW

| Identified Phase | Space Group | 3.5 lb/hr Sample Lattice Parameter (Å) | 18.0 lb/hr Sample Lattice Parameter (Å) |
|---|---|---|---|
| alpha-Fe | Im-3m | a = 2.870 | a = 2.875 |
| gamma-Fe | Fm-3m | a = 3.596 | a = 3.600 |
| $M_2B$ | I4/mcm | a = 5.141 | a = 5.139 |
| | | c = 4.206 | c = 4.237 |
| $M_3B$ | I-4 | a = 8.593 | a = 8.601 |
| | | c = 4.343 | c = 4.348 |
| $M_1C_1$ | Fm3m | a = 4.451 | a = 4.456 |
| $M_{23}C_6$ | Fm-3m | a = 10.221 | a = 10.227 |

Figure 6B:
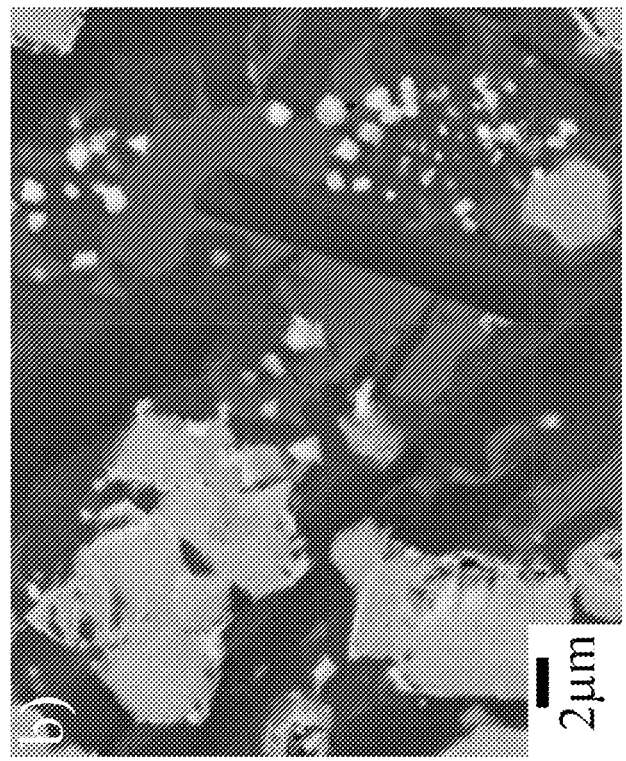
FIGS. 6a and 6b illustrate exemplary SEM backscattered electron micrographs of an ALLOY 5 PTAW sample which was welded at 3.5 lb/hr; a) low magnification, b) high magnification.
Figure 6A:
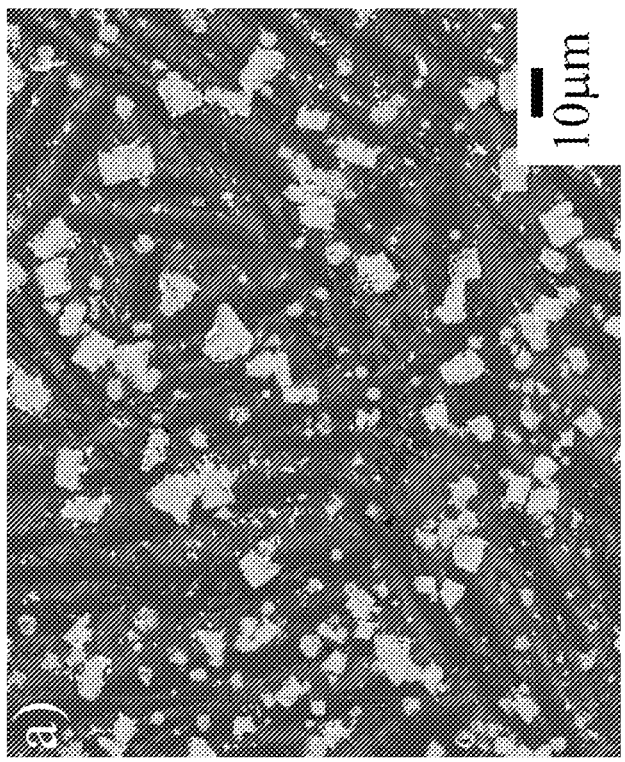
Figure 7B:
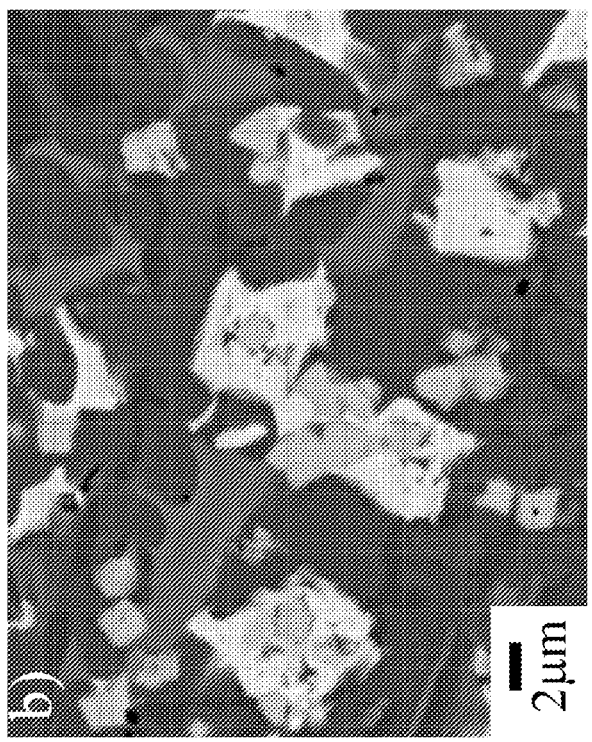
FIG. 7a and 7b illustrate exemplary SEM backscattered electron micrographs of an ALLOY 5 PTAW sample which was welded at 18.0 lb/hr; a) low magnification, b) high magnification.
Figure 7A:
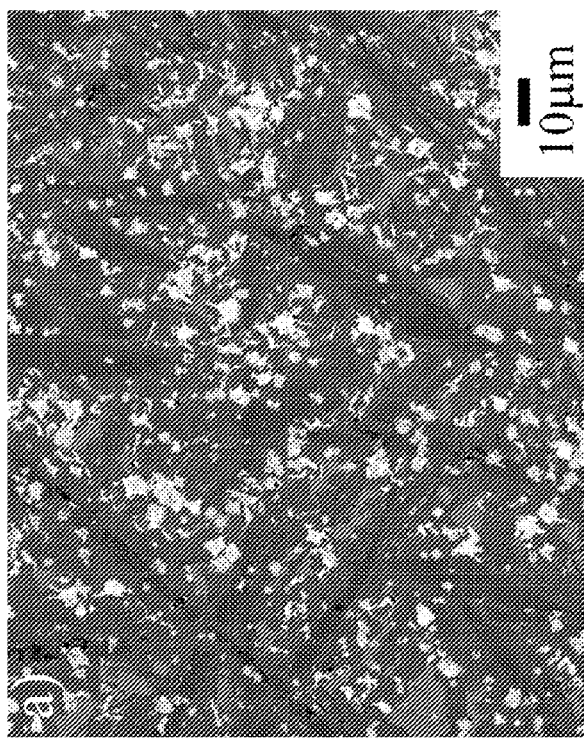

SEM backscattered electron micrographs are shown for the 3.5 and 18.0 lb/hr ALLOY 5 PTAW samples in FIGS. 6a, 6b, 7a and 7b. FIGS. 6a and 6b illustrate SEM backscattered electron micrographs of an ALLOY 5 PTAW sample which was welded at 3.5 lb/hr at a) low magnification and b) high magnification. FIG. 7a and 7b illustrate SEM backscattered electron micrographs of an ALLOY 5 PTAW sample which was welded at 18.0 lb/hr at a) low magnification and b) high magnification. In these Figures, a range of carbide and boride precipitates can be found which are various shapes including cubic, tetragonal, and irregular shaped. Note that limited EDS studies of the various phases formed indicate that many of these phases contain both boron and carbon indicating that rather than distinct complex borides or carbides, they may be considered complex borocarbide phases. The scale of these borocarbide phases vary but typically are found to be in three size classes, large primary rectangular shaped phases 2 to 10 μm wide and 10 to 60 μm long, medium cubic shaped 2 to 10 μm in size, and small secondary precipitates from 300 nm to 1000 nm in size.

Figure 8B:
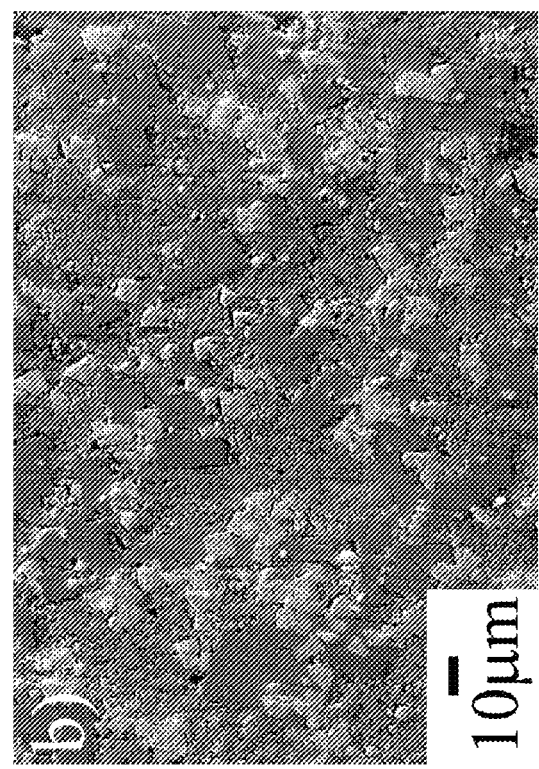
FIG. 8a and 8b illustrate exemplary SEM secondary electron micrographs of an ALLOY 5 PTAW sample which was welded at 3.5 lb/hr; a) low magnification, b) high magnification.
Figure 8A:
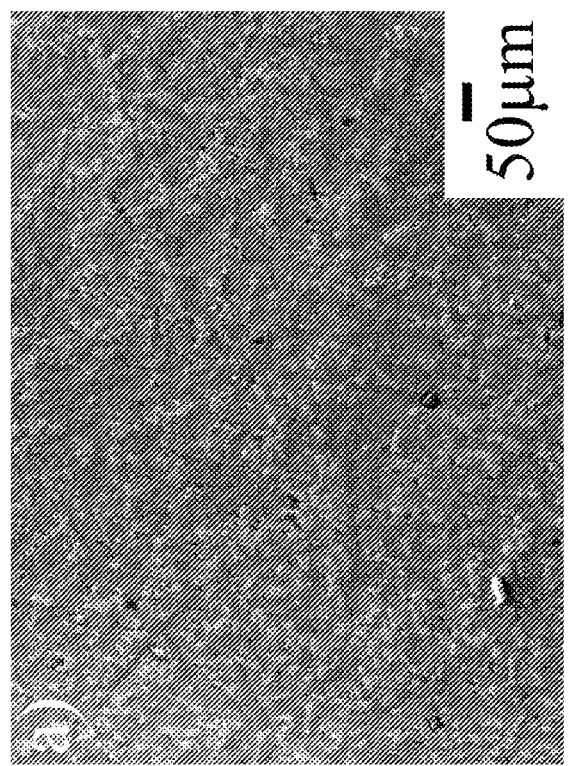

The wear scar was examined after ASTM G65 wear testing using secondary electrons. Secondary electrons are useful since they may illustrate height changes in the sample. In FIGS. 8a and 8b, secondary electron images are shown at two different magnifications of the wear scar surface after ASTM G65 wear testing of the 3.5 lb/hr ALLOY 5 PTA sample. As shown, on the microscale level, no preferential wearing of individual phases can be found but instead a uniform wear scar develops. Note that the standard sand in the ASTM G65 test is AFS 50/70 which is a coarse sand from 212 to 300 μm in size. Since the hard boride, carbide, and borocarbide phases found in the ALLOY 5 PTA sample are much finer than the length scale of the testing sand, preferential wear of the softer matrix (i.e. α-Fe and γ-Fe) may not occur.

Example #2

GMAW Weld Overlay

Figure 9:
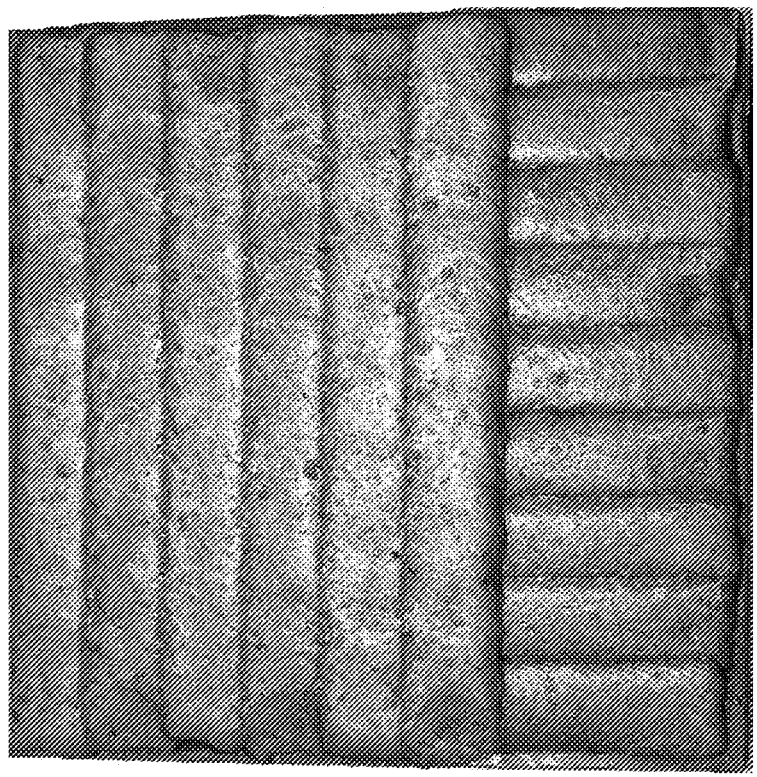
FIG. 9 illustrates a picture of exemplary ALLOY 5 GMAW hardfacing deposit in the form of a two pass weld overlay wear plate.

ALLOY 5 was produced as a continuous metal cored wire in 1/16" diameter (1.6 mm) which may be an appropriate feedstock for hardfacing. The ALLOY 5 cored wire was deposited as a hardfacing overlay onto A36 substrates using a Miller Delta-Fab MIG welding system. The hardfacing was deposited over a wide parameter range but for the results in this example the parameters that were used are shown in Table 12. In FIG. 9, a picture of a two pass GMAW weld overlay wear plate (8" by 8" outside dimensions) of ALLOY 5 is shown.

TABLE 12

Weld Parameters for ALLOY 5 GMAW

| | |
|---|---|
| Current | DCRP |
| Volts | 23 |
| Wire feed | 250 ipm wire |
| Shielding Gas | 75% Ar-25% $CO_2$ |
| Stickout | ½" |

Figure 10B:
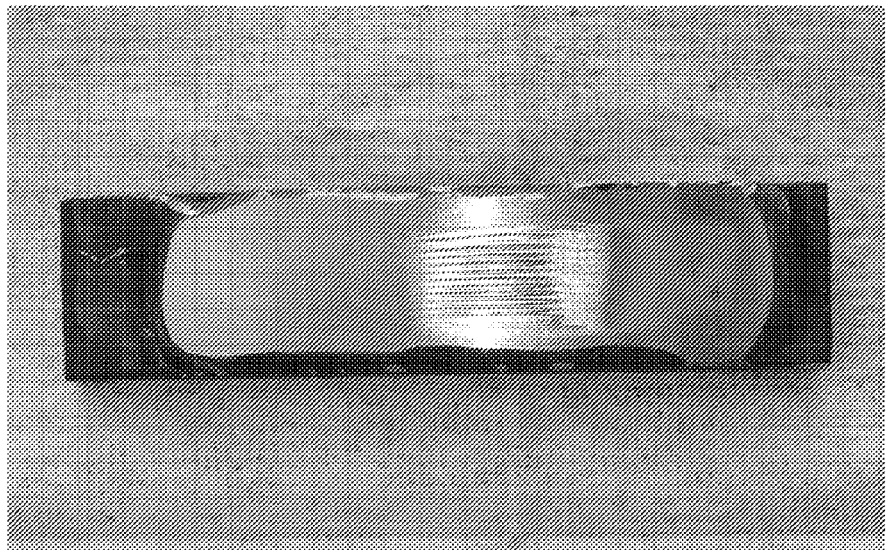
FIGS. 10a and 10b illustrate exemplary ALLOY 5 GMAW weld overlays after wear testing; a) 1-pass sample, b) 2-pass sample.
Figure 10A:
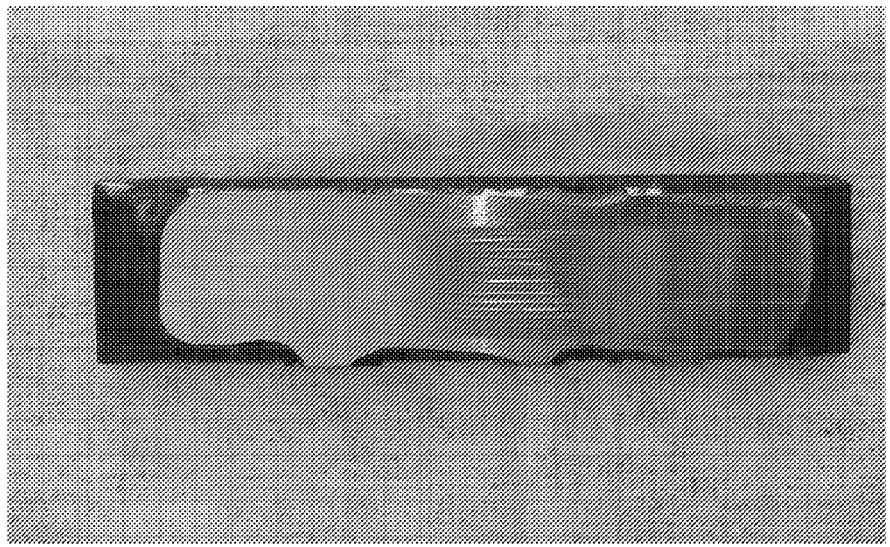

Hardness of single pass and double pass GMAW weld overlay samples of ALLOY 5 was measured using Rockwell C and the results are summarized in Table 13. As shown, very high hardness was obtained with the average being over Rc 71. In FIGS. 10a and 10b pictures are shown of the a) 1-pass and b) 2-pass GMAW samples of ALLOY 5 and the resulting results of wear testing are shown following ASTM G65 Procedure A in Table 14. Note that additionally, a second 6,000 cycle measurement was done in the wear scar of the first. As shown, very low wear rates were obtained with mass losses found from 0.05 to 0.07 g.

TABLE 13

Rc Hardness on ALLOY 5 Weld Overlay Samples

| Hardness Rc | ALLOY 5 (1-pass) | ALLOY 5 (2-pass) |
|---|---|---|
| Point 1 | 72.1 | 72.0 |
| Point 2 | 70.8 | 70.7 |
| Point 3 | 70.3 | 71.0 |
| Point 4 | 70.7 | 71.9 |
| Point 5 | 71.5 | 71.4 |
| Point 6 | 72.0 | 70.9 |
| Point 7 | 72.5 | 70.9 |
| Point 8 | 70.7 | 71.6 |
| Point 9 | 71.3 | 71.9 |
| Point 10 | 72.3 | 71.8 |
| Average | 71.4 | 71.4 |

TABLE 14

ASTM G65 Procedure A Wear Results on ALLOY 5 GMAW Samples

| Sample | ASTM G-65 Procedure A mass loss (g) | |
|---|---|---|
| Pass | $1^{st}$ 6000 cycles | $2^{nd}$ 6000 cycles |
| ALLOY 5 GMAW 1-pass | 0.06 | 0.05 |
| ALLOY 5 GMAW 2-pass | 0.05 | 0.07 |

Figure 11A:
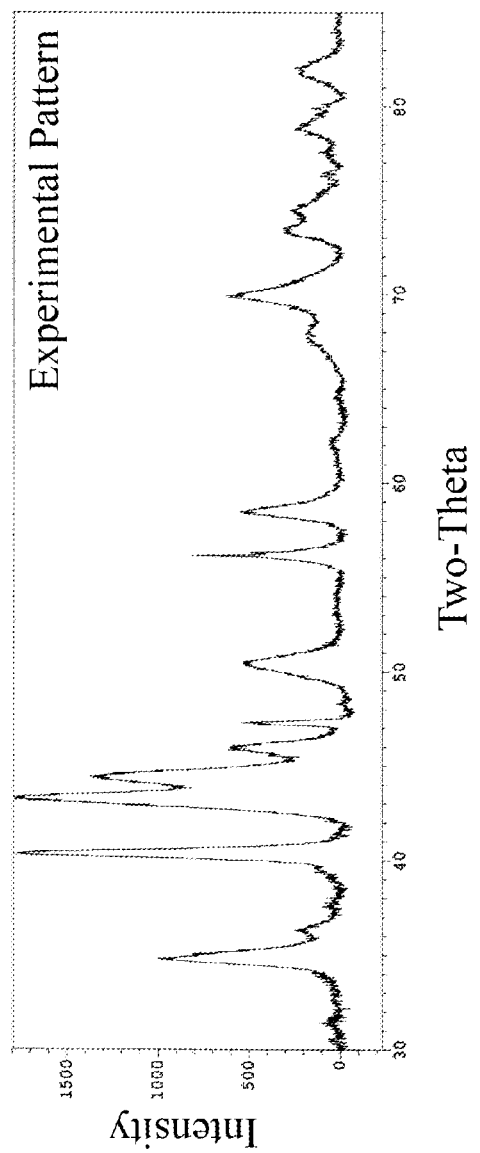
FIGS. 11a and 11b illustrate exemplary experimental (a) and Rietveld refined (b) X-Ray diffraction scans of an ALLOY 5 GMAW sample.
Figure 11B:
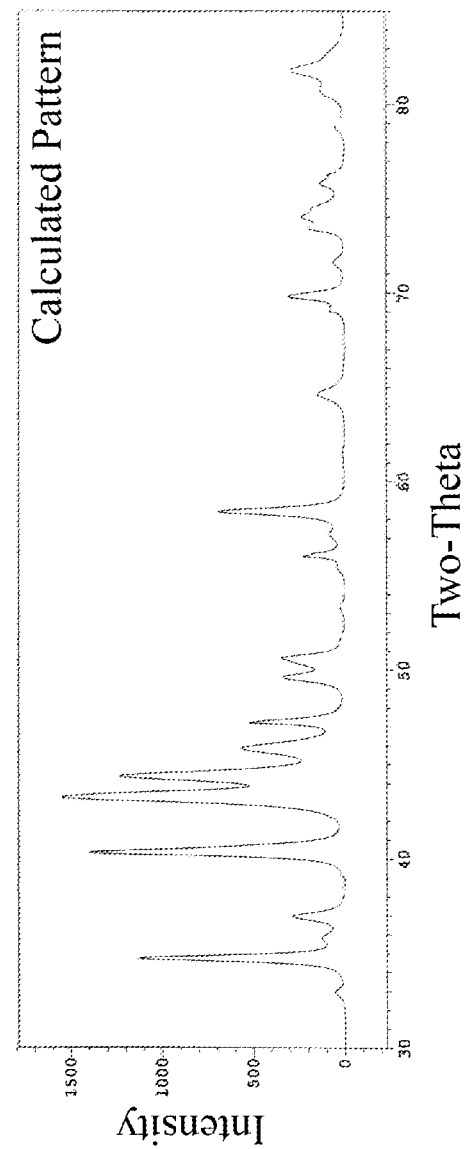
Figure 12B:
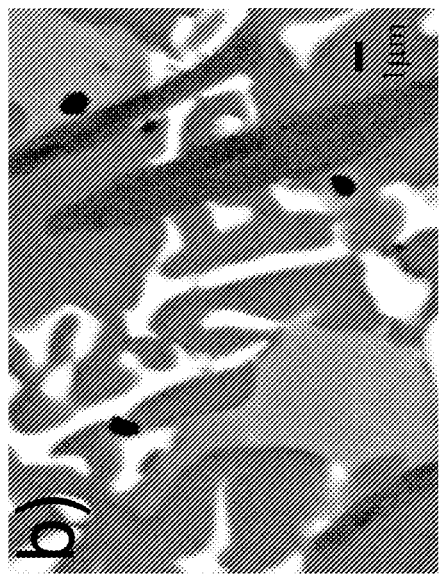
FIGS. 12a, 12b, 12c and 12d illustrate exemplary SEM backscattered electron micrographs showing an exemplary GMAW weld structure of ALLOY 5; a) low magnification showing structure; b) high magnification of the matrix phase, c) high magnification of primary borocarbide phase type 1, and d) high magnification of borocarbide phase type 2.
Figure 12A:
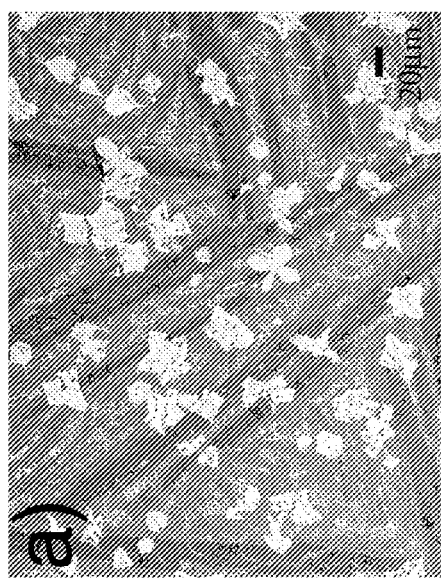
Figure 12D:
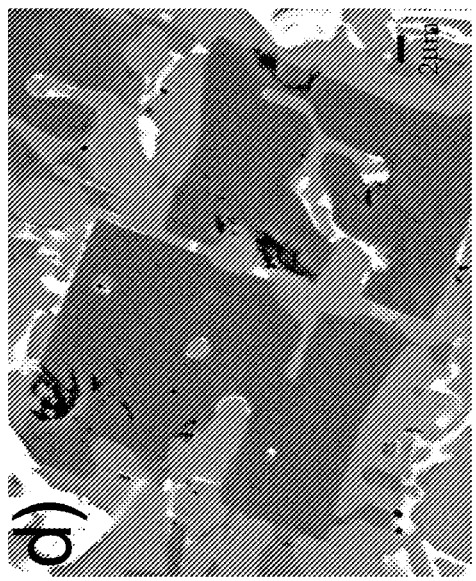
Figure 12C:

The microstructure of the weld overlay deposits were analyzed using X-ray diffraction to identify the phases present and by using backscattered electrons in the SEM to show the size and distribution of the phases present. The X-ray diffraction diagrams were further analyzed using Rietveld analysis to identify the phases present. In FIG. 11a an X-ray diffraction diagram is shown of the ALLOY 5 double pass GMAW sample. After Rietveld refinement illustrated in FIG. 11b, the phases were identified in the alloy and are shown in Table 15. The results show that a range of complex borides (i.e. $M_2B$) and complex carbides ($M_1C_1$ and $M_{23}C_6$) exist in a ductile matrix consisting of both α-Fe and γ-Fe phases.

TABLE 15

Phases Identified/Space Group/Lattice Parameters For ALLOY 5 GMAW

| Identified Phase | Space Group | 3.5 lb/hr Sample Lattice Parameter (Å) |
|---|---|---|
| alpha-Fe | Im-3m | a = 2.880 |
| gamma-Fe | Fm-3m | a = 3.596 |
| $M_2B$ | I4/mcm | a = 5.002 |
| | | c = 4.201 |
| $M_1C_1$ | Fm3m | a = 4.461 |
| $M_{23}C_6$ | Fm-3m | a = 10.850 |

SEM backscattered electron micrographs are shown at a range of magnification for the ALLOY 5 GMAW samples in FIGS. 12a, 12b, 12c and 12d. In these Figures a range of carbide and boride precipitates can be found which are various shapes including cubic, tetragonal, and irregular shaped. Note that limited EDS studies of the various phases formed indicate that many of these phases contain both boron and carbon indicating that rather than distinct complex borides or carbides, they may be best considered complex borocarbide phases. The scale of these borocarbide phases vary but typically are found to be in three size classes, large primary rectangular shaped phases 5 to 20 μm wide and 50 to 175 μm long, medium cubic shaped 10 to 20 μm in size, and small secondary precipitates from 500 nm to 1.5 μm in size.

Example #3

GMAW Weld Overlay—Effects of Dilution

Two alloys, ALLOY 5 and ALLOY 6, were separately GMAW welded onto A36 steel substrates. The weld parameters are shown in Table 12. The weld overlay samples were cut and mounted in cross section. Vickers (HV300) microhardness measurements were taken at regular intervals in a line from inside the base metal and then up through the bulk of the weld overlay. The results of the microhardness traverses are shown in Table 16. The A36 base metal is soft with average hardness of ≠215 while the weld overlays are much harder with hardness typically from 940 to 1330. As the data in the Table shows, the hardness of the weld overlay is achieved in 1 or 2 hardness measurements away from the dilution layer.

Figure 13:
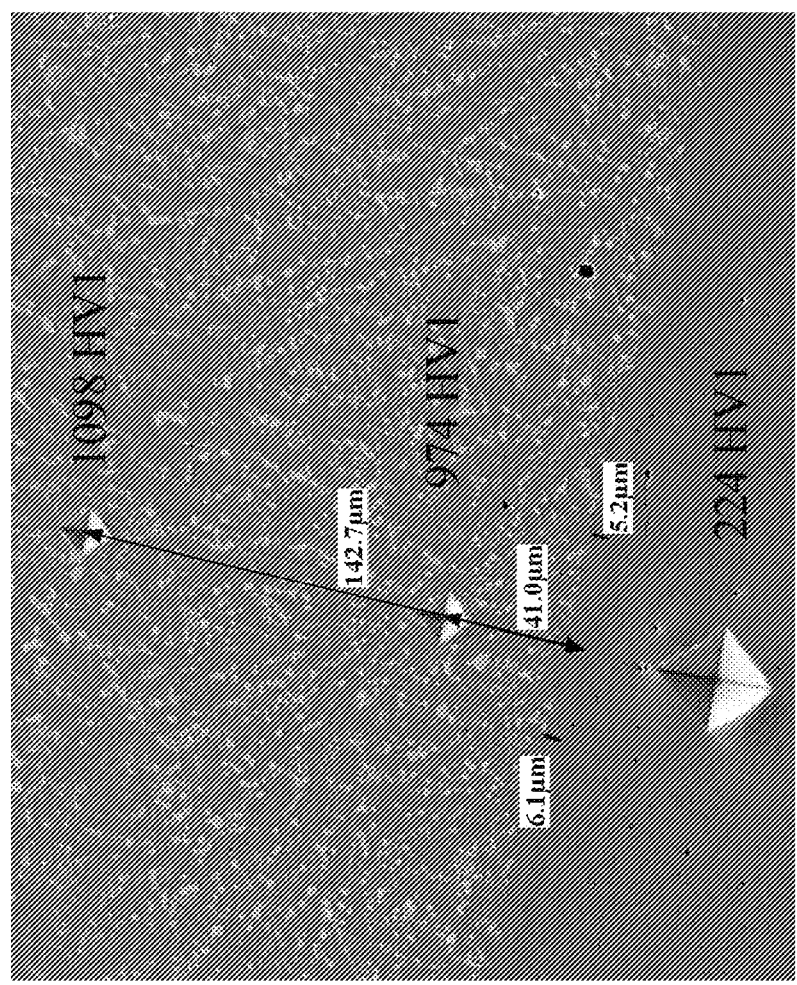
FIG. 13 illustrates an exemplary SEM backscattered electron micrograph of an ALLOY 5 single pass GMAW weld overlay showing the change in Vickers microhardness from the substrate into the base metal.
Figure 14:
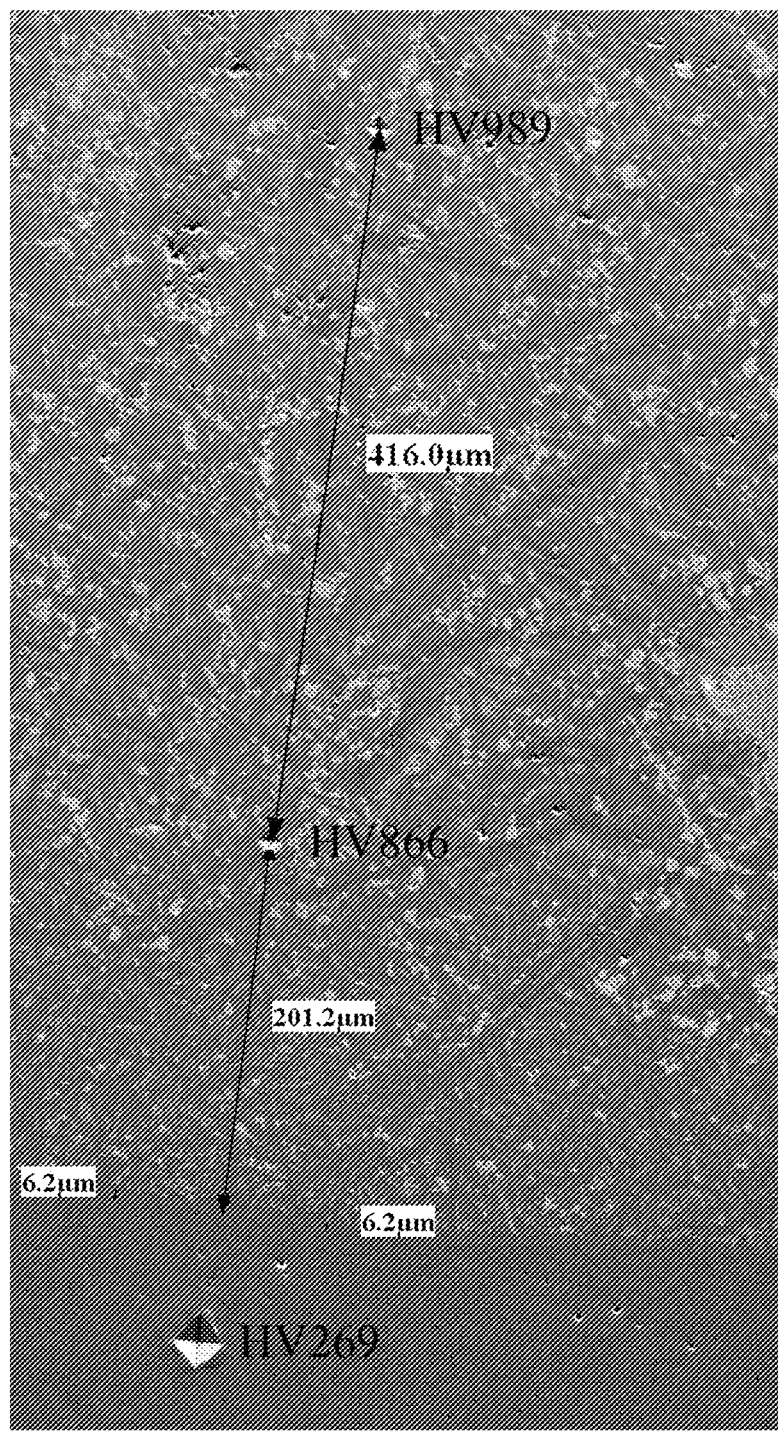
FIG. 14 illustrates an exemplary SEM backscattered electron micrograph of an ALLOY 6 double pass GMAW weld overlay showing the change in Vickers microhardness from the substrate into the base metal.

In FIGS. 13 and 14, exemplary SEM backscattered electron micrographs are shown of ALLOY 5 and ALLOY 6 respectively at the interface of the base metal/weld overlay and then up into the weld overlay. Note that the difference in hardness readings may easily be discerned from the size of the hardness indentation and the individual points are located from the point number in Table 16. In the ALLOY 5 single pass case, it can be seen that high hardness is obtained in 41 microns from the base metal interface. Note that Rc 68 is roughly equivalent to HV300 of 940 so this may be considered a very high hardness point in the weld overlay metal. In the ALLOY 6 double pass welds, the microhardness point spacing was greater but it is clear that high hardness was obtained at the 210 μm point away from the base metal interface but since the microstructure looks similar in the range of distance from 41 to 210 μm, it is quite likely that the high hardness was obtained in a similar fashion to the ALLOY 5 sample, that is before the 210 μm point.

TABLE 16

Vickers Microhardness on GMAW Weld Overlays

| Vickers Hardness (HV300 - kg/mm$^2$) | ALLOY 5 (1-pass sample) | ALLOY 6 (2-pass sample) |
| --- | --- | --- |
| Weld Overlay Material | | |
| Point 17 | 1122 | 828 |
| Point 16 | 1139 | 1162 |
| Point 15 | 1159 | 945 |
| Point 14 | 1082 | 940 |
| Point 13 | 1153 | 1216 |
| Point 12 | 1001 | 943 |
| Point 11 | 1169 | 1326 |
| Point 10 | 1070 | 1250 |
| Point 9 | 1069 | 1008 |
| Point 8 | 1098 | 953 |
| Point 7 | 974 | 989 |
| Point 6 | 224 | 866 |
| Point 5 | 214 | 269 |
| Point 4 | 214 | 219 |
| Point 3 | 193 | 211 |
| Point 2 | 201 | 217 |
| Point 1 | 191 | 226 |

Base metal - A36 Steel

Based on the GMAW weld parameters, it would be expected that the dilution layer of the weld material would be approximately 30%. Since the single pass thickness is approximately 0.15" (0.381 cm), then the expected dilution layer would be expected to extend to 1150 μm. Thus, while the dilution layer, which is governed by diffusion does exist, the weld overlays were designed so that when welded onto base steel substrates the dilution would not lower hardness. Note that these results are in agreement with the single and double pass hardness and wear results presented for a large number of these alloys in Tables 2 through 9. In conventional GMAW alloys, often 2, 3, or more passes may be necessary to reach the maximum hardness and wear resistance but in the alloys presented in this disclosure the maximum hardness /wear can be reached in one layer.

The foregoing description is provided to illustrate and explain the present invention. However, the description hereinabove should not be considered to limit the scope of the invention set forth in the claims appended here to.

What is claimed is:

1. A method for hardfacing a substrate comprising the steps of: providing a composition comprising 35 to 65 at % of a base metal comprising iron and manganese, 10 to 50 at % of an interstitial element selected from the group of boron, carbon, silicon and combinations thereof, 3 to 30 at % of a transition metal selected from the group of chromium, molybdenum, tungsten and combinations thereof, and 1 to 15 at % of niobium; and welding said composition onto a substrate to form a substantially glass composition containing precipitate phases wherein said composition has a freezing temperature and undercooling by lowering the temperature of said composition below said freezing temperature and maintaining the composition in liquid form; wherein when said composition is applied to said substrate said composition has a weld deposit hardness greater than or equal to Rc 64 and exhibits a maximum hardness within 250 microns of the substrate surface, wherein said composition forms a ductile matrix of either α-Fe or γ-Fe including phases of borocarbides and has volume fractions of said-borocarbide precipitates of greater than 15% and up to 75%, wherein said precipitate phases exhibit a grain size in the range of 400 nm to 25 um and wherein said borocarbide phases are also present in size classes comprising one or more of the following: (1) rectangular phases of 5 um to 20 um wide and 50 um to 175 um long; (2) rectangular phases of 2 um to 10 um wide and 10 um to 60 um long; (3) cubic phases of 2 um to 10 um in size; and (4) cubic phases of 10 um to 20 um in size.

2. The method of claim 1 further comprising atomizing said composition and forming a powder, wherein said powder has a particle size in the range of 15 μm to 250 μm.

3. The method of claim 1 further comprising forming said composition into a cored wire having a diameter in the range of 0.01 inches to 0.50 inches.

4. The method of claim 1 further comprising forming said composition into a stick electrode having a diameter in the range of 0.01 inches to 0.50 inches.

5. The method of claim 1 wherein said welding further comprises a processes selected from the group consisting of laser welding, plasma transferred arc-welding (PTAW), gas metal arc-welding (GMAW), metal inert gas welding (MIG), submerged arc welding, open arc welding, shielded metal arc welding (SMAW), stick welding and combinations thereof.

* * * * *